United States Patent
Welense et al.

(10) Patent No.: US 11,523,453 B2
(45) Date of Patent: Dec. 6, 2022

(54) GUIDED FREQUENCY SETUP FOR CONFIGURATION OF WIRELESS RECEIVERS

(71) Applicant: Shure Acquisition Holdings, Inc., Niles, IL (US)

(72) Inventors: William Welense, Chicago, IL (US); Yunyi Wang, Chicago, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 64 days.

(21) Appl. No.: 17/019,064

(22) Filed: Sep. 11, 2020

(65) Prior Publication Data
US 2021/0084704 A1    Mar. 18, 2021

Related U.S. Application Data

(60) Provisional application No. 62/900,190, filed on Sep. 13, 2019.

(51) Int. Cl.
| | |
|---|---|
| *H04W 76/15* | (2018.01) |
| *H04W 76/11* | (2018.01) |
| *H04W 48/16* | (2009.01) |
| *H04W 56/00* | (2009.01) |

(52) U.S. Cl.
CPC .......... *H04W 76/15* (2018.02); *H04W 48/16* (2013.01); *H04W 56/0005* (2013.01); *H04W 76/11* (2018.02)

(58) Field of Classification Search
None
See application file for complete search history.

(56) References Cited

U.S. PATENT DOCUMENTS

| | | | |
|---|---|---|---|
| 7,162,733 B2 | 1/2007 | Kamieniecki | |
| 10,292,159 B2 | 5/2019 | Amini | |
| 2012/0281848 A1* | 11/2012 | Koch | H04B 17/309 |
| | | | 381/58 |
| 2016/0014613 A1 | 1/2016 | Ponnampalam | |
| 2019/0081715 A1* | 3/2019 | Arrington | H04H 20/71 |

FOREIGN PATENT DOCUMENTS

| | | |
|---|---|---|
| EP | 2898602 | 7/2015 |
| WO | 2014046780 | 3/2014 |
| WO | 2017040904 | 3/2017 |

OTHER PUBLICATIONS

Sennheiser, EM 500 Instruction Manual, published Dec. 2016 (Year: 2016).*
Sennheiser, "Wireless System Manager", May 2013 (Year: 2013).*
International Search Report and Written Opinion for PCT/US2020/050556 dated Nov. 20, 2020, 12 pp.

* cited by examiner

*Primary Examiner* — German Viana Di Prisco
(74) *Attorney, Agent, or Firm* — Neal, Gerber & Eisenberg LLP

(57) ABSTRACT

A wireless receiver includes a guided user interface to enable and assist users to optimally select groups and frequencies for wireless communication with wireless transmitters is provided. The wireless receiver may automatically detect the connectedness and parameters of wireless receivers in order to adaptively display and select setup options and messages. The guided user interface may improve user satisfaction and reduce the configuration time of the wireless receivers.

19 Claims, 6 Drawing Sheets

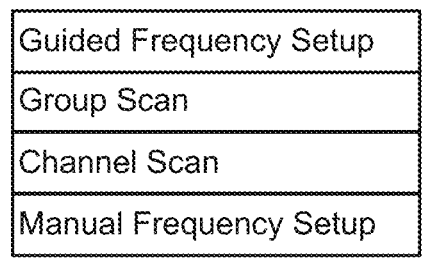
FIG. 4
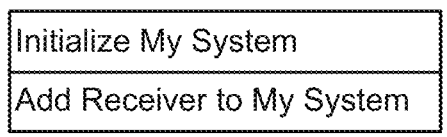    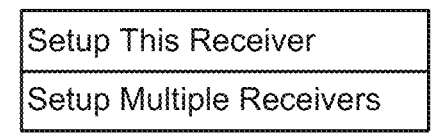
FIG. 5          FIG. 6

First, turn ON all transmitters in your system.

Next, turn OFF the transmitter you are about to add.

FIG. 7

Always use the SAME GROUP NUMBER on all receivers in your system.

FIG. 8

Please power OFF all transmitters before scanning

FIG. 9

Please connect other receivers to this receiver

FIG. 10

Please power OFF transmitter before scanning

FIG. 11

We're about to perform a Group Scan. This will find the best Group of Channels to use for your system.

FIG. 12

Scan completed. Please sync your transmitter(s).

FIG. 13

GUIDED FREQUENCY SETUP FOR CONFIGURATION OF WIRELESS RECEIVERS

CROSS-REFERENCE TO RELATED APPLICATIONS

This application claims priority from U.S. Provisional Application Ser. No. 62/900,190, filed on Sep. 13, 2019, the content of which is incorporated herein by reference in its entirety.

TECHNICAL FIELD

This application generally relates to guided frequency setup for configuration of wireless receivers. In particular, this application relates to wireless receivers having a guided user interface that enables and assists users to optimally select groups and frequencies for wireless communication between wireless receivers and wireless transmitters.

BACKGROUND

Audio production can involve the use of many components, including microphones, wireless audio transmitters, wireless audio receivers, recorders, and/or mixers for capturing, recording, and presenting the sound of productions, such as television programs, newscasts, movies, live events, and other types of productions. The microphones typically capture the sound of the production, which is wirelessly transmitted from the microphones and/or the wireless audio transmitters to the wireless audio receivers. The wireless audio receivers can be connected to a recorder and/or a mixer for recording and/or mixing the sound by a crew member, such as a production sound mixer. Electronic devices, such as computers and smartphones, may be connected to the recorder and/or mixer to allow the crew member to monitor audio levels and timecodes.

Wireless audio transmitters, wireless audio receivers, wireless microphones, and other wireless communication devices include antennas for transmitting and receiving radio frequency (RF) signals which contain digital or analog signals, such as modulated audio signals, data signals, and/or control signals. Users of wireless communication devices include stage performers, singers, actors, news reporters, and the like.

A wireless audio receiver may be able to receive RF signals from one or more wireless audio transmitters over one or more channels and corresponding frequencies. For example, a wireless audio receiver may have a single receiver channel so that the receiver is able to wirelessly communicate with one wireless audio transmitter at a corresponding frequency. As another example, a wireless audio receiver may have multiple receiver channels, where each channel can wirelessly communicate with a corresponding wireless audio transmitter at a respective frequency.

Multiple wireless audio receivers may be combined together in some scenarios in order to achieve a desired number of receiver channels. The wireless audio receivers may be directly or indirectly wired together, such as via Ethernet cables, switches, and/or other networking devices, in order to connect them together. For example, a user may need to have 16 receiver channels to wirelessly communicate with 16 wireless transmitters. In this scenario, eight wireless audio receivers with two receiver channels each may be connected together to form a networked system having 16 receiver channels. One of the wireless audio receivers could then be utilized to configure all of the wireless audio receivers and all of the receiver channels.

In other scenarios, a user may decide to utilize multiple wireless audio receivers that are not combined together in order to achieve the desired number of receiver channels. For example, a user may need to have two receiver channels to wirelessly communicate with two wireless transmitters. In this scenario, two wireless audio receivers with one receiver channel each may be independently operated and configured.

A wireless microphone system may include a wireless receiver and a wireless transmitter in communication with one another. Since the wireless microphone system operates on one frequency, the wireless receiver and the wireless transmitter communicate using the same frequency. When multiple wireless transmitters are being simultaneously used in the same location, the wireless transmitters should communicate using different frequencies in order to avoid intermodulation or interference. To minimize interference, wireless microphone systems can organize RF frequency bands into predefined groups and channels. A group may be a set of compatible frequencies within a frequency band, and a single frequency within a group may be a channel. As such, all wireless receivers operating in the same frequency band should be set to the same group, in order to be used simultaneously in the same location.

Existing wireless audio receivers may have features to assist users in configuring systems of wireless audio receivers by determining optimal frequencies for the receiver channels. One such feature, sometimes called group scan, can find the best group of compatible channels and frequencies to use in a particular physical environment and/or configuration, and may result in assigning a channel and corresponding frequency to each pair of wireless audio receivers and wireless audio transmitters in a system. Another such feature, sometimes called channel scan, can find the best channel and corresponding frequency within a particular group for a single pair of wireless audio receiver and wireless audio transmitter.

However, some users may have difficulty configuring systems of wireless audio receivers such that the frequencies used for wireless communication with wireless audio transmitters may not be properly and optimally chosen. For example, the optimal frequencies for wireless communication between wireless audio receivers and wireless audio transmitters may be impacted by factors such as the environment the system is in and whether other wireless communications systems are being used in proximity to the system. Users may have difficulty with configuration due to the numerous possible combinations and configurations of wireless audio receivers, and lack of experience and knowledge with wireless communication systems, among other reasons.

As an example of such difficulties, it is generally preferred to initially configure a system using the group scan feature so that all groups and frequencies are scanned to find the best group for a particular situation. However, if a user manually chooses a group, it is possible that suboptimal frequencies may be assigned, which can result in degraded wireless communication between the wireless audio receivers and the wireless audio transmitters.

As another example, a user may place a first wireless audio receiver and wireless audio transmitter pair on a channel in one group, while placing a second wireless audio receiver and wireless audio transmitter pair on a channel in a different group. In this scenario, the two wireless audio transmitters could adversely interact with one another due to the user inadvertently selecting an incompatible group and channel combination.

As a further example, a user might not synchronize a wireless audio transmitter with the wireless audio receiver after a channel and frequency has been assigned. The user may not perform this synchronization due to lack of knowledge and experience, among other reasons. If this occurs, a different wireless audio receiver could assign the same channel and frequency to a different wireless audio transmitter, which can result in interference.

Accordingly, there is an opportunity for wireless receivers that can be configured using a guided frequency setup in order to enable and assist users to optimally select groups and frequencies for wireless communication with wireless transmitters.

SUMMARY

The invention is intended to solve the above-noted problems by providing a wireless receiver that includes a guided user interface that is designed to, among other things: (1) automatically detect the connectedness and parameters of wireless receivers; (2) adaptively display and/or select setup options on a display of the wireless receiver related to configuring groups and frequencies of the wireless receivers; and (3) adaptively display messages to assist and direct users in properly and optimally configuring groups and frequencies of the wireless receivers.

In an embodiment, a wireless receiver may include an antenna configured to wirelessly communicate with a wireless transmitter at a frequency, a user interface for enabling a user to interact with the wireless receiver, a display, and a processor in communication with the antenna, the user interface, and the display. The processor may be configured to receive a request from the user interface to configure the frequency; display setup options on the display, including one or more of: (1) a setup of a system of connected wireless receivers, or (2) a setup of a single wireless receiver added to the system of connected wireless receivers; and receive a selection from the user interface of one of the setup options. The processor may also be configured to when the selection comprises the setup of the system of connected wireless receivers: display a first message on the display that is for directing the user to power off the wireless transmitter and other wireless transmitters to be used with the system, and perform a group scan function to assign the frequency for: (1) communication between the wireless receiver and the wireless transmitter, and (2) communication between pairs of one of the system of connected wireless receivers and one of the other wireless transmitters.

The processor may further be configured to when the selection comprises the setup of the single wireless receiver added to the system of connected wireless receivers: display a second message on the display that is for directing the user to power on other wireless transmitters previously configured for the system and to power off the wireless transmitter, and perform a channel scan function to assign the frequency for communication between the wireless receiver and the wireless transmitter. The processor may also be configured to perform a channel scan function to assign the frequency for communication between the wireless receiver and the wireless transmitter.

In another embodiment, a wireless communication system may include a plurality of wireless transmitters and a plurality of wireless receivers connected to one another. Each of the plurality of wireless receivers may be configured to wirelessly communicate with at least one of the plurality of transmitters at a frequency, where the one or more wireless receivers each includes an antenna, a user interface for enabling a user to interact with the wireless receiver, a display, and a processor in communication with the antenna, the user interface, and the display. The processor may be configured to receive a request from the user interface to configure the frequency; display setup options on the display including: (1) a setup of the plurality of wireless receivers, and (2) a setup of adding one of the plurality of wireless receivers; and receive a selection from the user interface of one of the setup options.

The processor may also be configured to when the selection comprises the setup of the plurality of wireless receivers, display a first message on the display that is for directing the user to power off the plurality of wireless transmitters, and perform a group scan function to assign the frequency for communication between pairs of one of the plurality of wireless receivers and one of the plurality of wireless transmitters. The processor may further be configured to when the selection comprises the setup of adding one of the plurality of wireless receivers, display a second message on the display that is for directing the user to power on any of the plurality of wireless transmitters previously configured for the system and to power off one of the wireless transmitters to be paired with the added wireless receiver, and perform a channel scan function to assign the frequency for communication between the added wireless receiver and the paired wireless transmitter.

These and other embodiments, and various permutations and aspects, will become apparent and be more fully understood from the following detailed description and accompanying drawings, which set forth illustrative embodiments that are indicative of the various ways in which the principles of the invention may be employed.

BRIEF DESCRIPTION OF THE DRAWINGS

FIGS. 4-15 are exemplary depictions of menus and messages of the guided user interface of a wireless receiver for configuring groups and frequencies of wireless communication between wireless receivers and wireless transmitters, in accordance with some embodiments.

DETAILED DESCRIPTION

Figure 1:
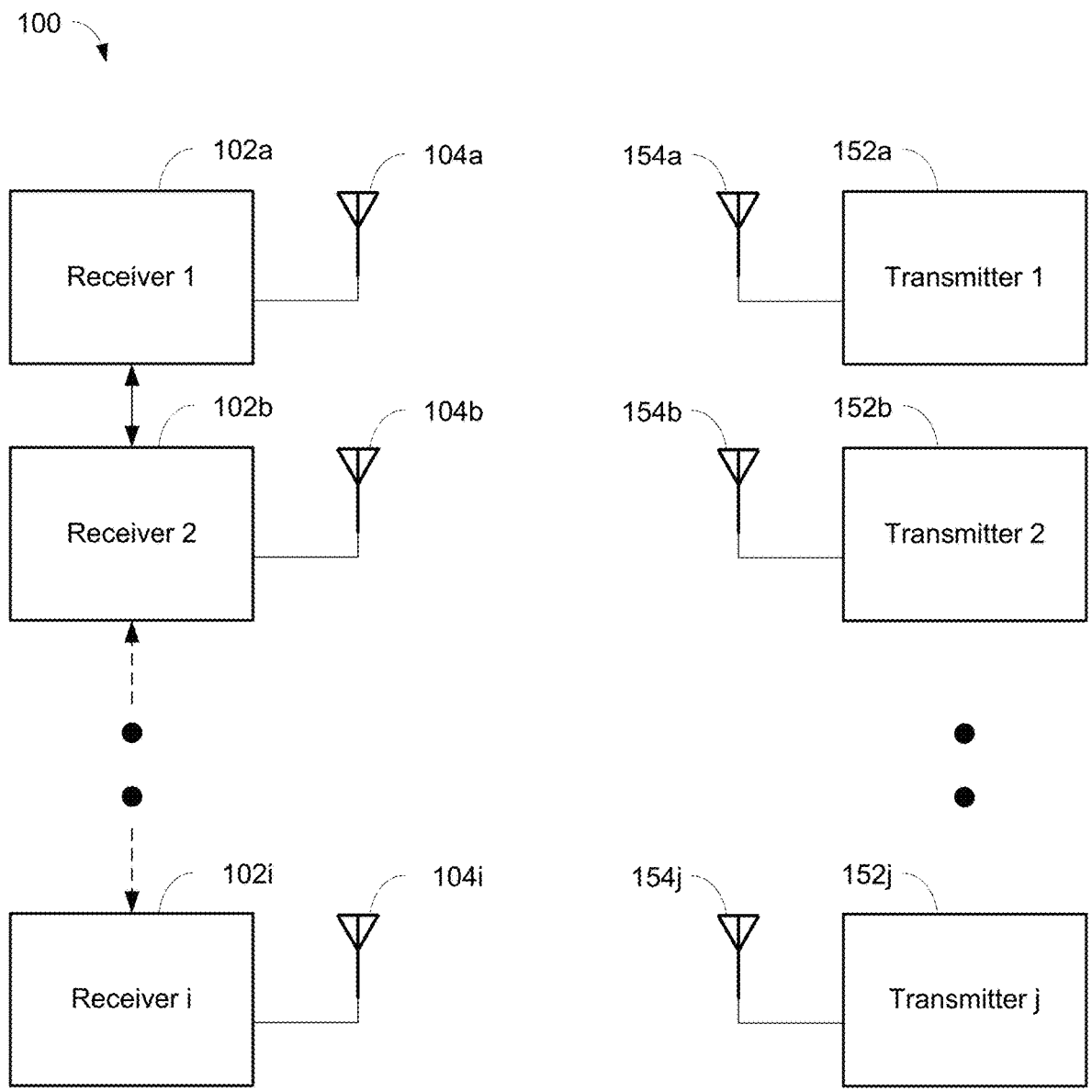
FIG. 1 is a schematic diagram of a wireless communications system including wireless receivers and wireless transmitters, in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

The wireless receiver having a guided user interface as described herein can enable and assist users to optimally select groups and frequencies for wireless communication with wireless transmitters. Through use of the guided user interface, each pairing of wireless receivers and wireless transmitters may ultimately be assigned a channel and corresponding frequency that is compatible with the environment the system is in, and that takes into account the frequencies that may be used by nearby wireless devices. The guided user interface on a wireless receiver can walk users through the setup of one or more wireless receivers by adaptively displaying setup options and messages on the display of the wireless receiver. The setup options and messages may be adaptively displayed and selected based on selections from the user and/or automated detection of the connectedness and parameters of the wireless receivers. In this way, the most optimal groups and frequencies can be scanned and found for the particular scenario and configuration of wireless receivers.

The setup options may vary based on whether a user is initially setting up a system of connected wireless receivers, adding a wireless receiver to an already-configured system, setting up a single standalone wireless receiver, and/or setting up a system of unconnected wireless receivers. The setup options and messages may be displayed based on whether the wireless receiver is connected to other wireless receivers and/or other parameters. The connection of a wireless receiver to other wireless receivers may be automatically detected, in some embodiments, or manually indicated, in other embodiments. The messages may direct users to power on and/or power off certain wireless transmitters, depending on the selected setup option. The messages may also direct users to synchronize the wireless transmitters with the wireless receivers after the channels and frequencies have been chosen in order to properly set the assigned frequencies. The messages may further include definitions of the scanning features (e.g., group scan and channel scan) to inform users of the function of the scanning features before they are performed, which can reduce configuration mistakes. Through use of a wireless receiver with a guided user interface, user satisfaction may be improved and configuration time may be reduced.

FIG. 1 is a schematic diagram of an exemplary wireless communication system 100 that includes wireless receivers 102a, 102b, . . . , 102i having respective antennas 104a, 104b, . . . , 104i for receiving radio frequency (RF) signals. The system 100 may also include wireless transmitters 152a, 152b, . . . , 152j for transmission of the RF signals on respective antennas 154a, 154b, . . . , 154j. The RF signals transmitted by the transmitters 152 and received by the receivers 102 may include audio data signals, control signals, pilot signals, and/or synchronization signals that are modulated by analog and/or digital modulation schemes, for example.

In embodiments, the wireless receivers 102 may be stand-alone or rack-mountable units and the wireless transmitters 152 may be wireless microphones, body packs, etc. In embodiments, the wireless receivers 102 and/or the wireless transmitters 152 may have multiple antennas 104 or 154 to utilize antenna diversity and/or if multiple channels are included in a particular component. While FIG. 1 depicts multiple wireless receivers 102 and multiple wireless transmitters 152, it is contemplated and possible for there to be a single wireless receiver 102 and/or wireless transmitter 152. For example, in embodiments, a single wireless receiver 102 may have multiple channels and corresponding frequencies so that the wireless receiver 102 is able to communicate with multiple wireless transmitters 152 over the multiple channels. Regardless of the number of wireless receivers 102 and wireless transmitters 152 in a particular system, a particular pair of a wireless receiver 102 and a wireless transmitter 152 may communicate over a given channel at a certain frequency.

In some embodiments, the wireless receivers 102 may be directly or indirectly connected together, such as through Ethernet cables, other suitable wiring, switches, and/or other networking devices, and may be connected in any topology, such as daisy chain, point-to-point, bus, star, mesh, etc. When the wireless receivers 102 are connected together, the channels of the system of wireless receivers 102 may be utilized together for wirelessly communicating with the wireless transmitters 152 at various distinct frequencies. Moreover, in some embodiments, one of the wireless receivers 102a may be able to control and configure itself and the other wireless receivers 102b, . . . , 102i; or in other embodiments, each of the wireless receivers 102a, 102b, . . . , 102i may be each controllable and configurable. In further embodiments (not shown), the wireless receivers 102 may not be connected together such that they are independently operable and configurable.

As described in more detail below, the wireless receivers 102 may include a guided user interface that enables and assists users to optimally select groups and frequencies for wireless communication with the wireless transmitters 152. The guided user interface may be utilized regardless of whether the wireless receiver 102 is or is not connected to other wireless receivers 102.

Figure 2:
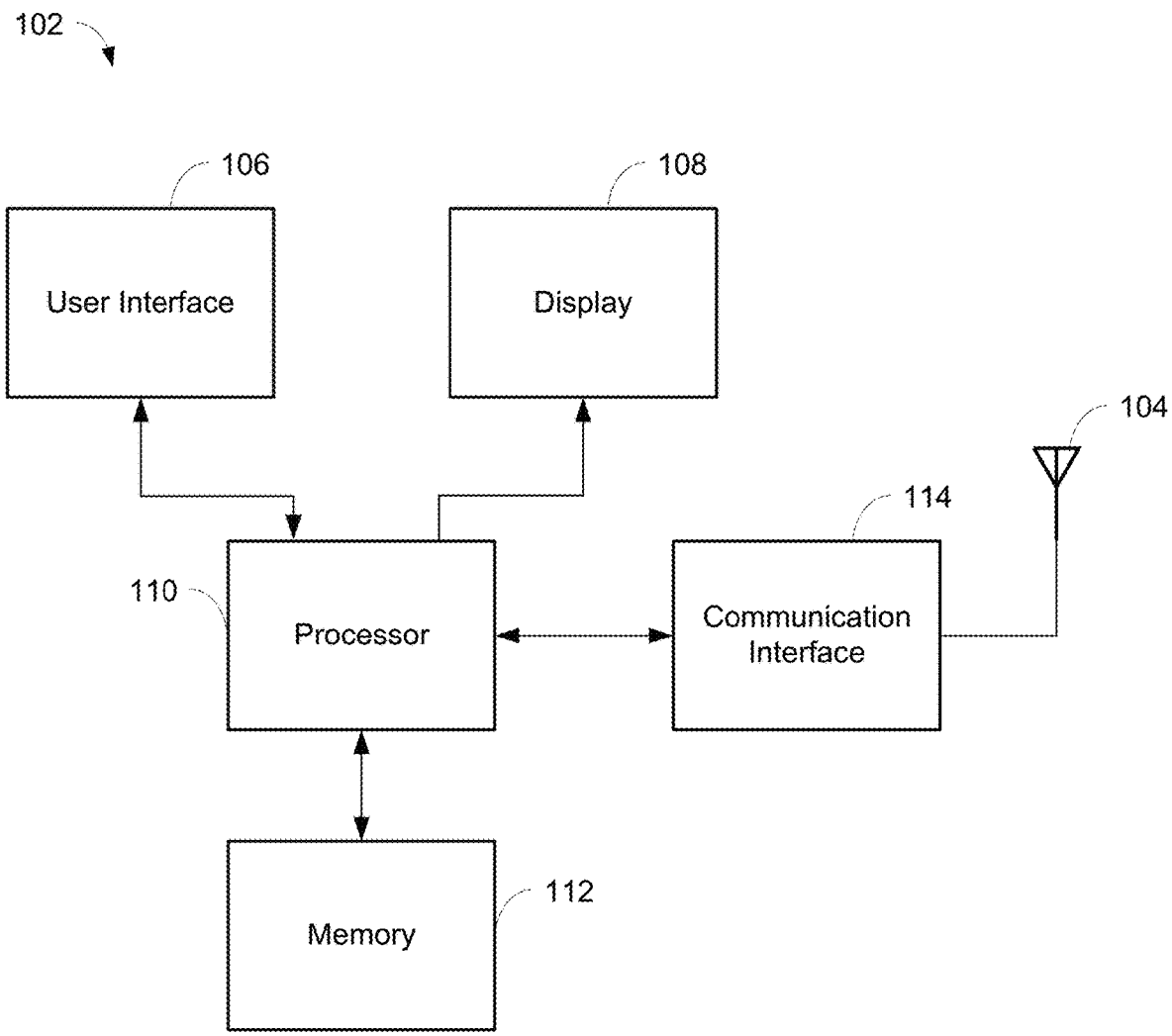
FIG. 2 is a schematic diagram of a portion of a wireless receiver, in accordance with some embodiments.

FIG. 2 is a schematic diagram of a portion of a wireless receiver 102 with a guided user interface that can be used in the wireless communication system 100 shown in FIG. 1. For simplicity, FIG. 2 does not show other components of the wireless receiver 102, such as demodulators, analog to digital converters, digital to analog converters, codecs, etc. The wireless receiver 102 may receive RF signals containing data signals, control signals, etc. that have been transmitted by one or more wireless transmitters, such as a wireless transmitter 152 in the wireless communication system 100 of FIG. 1. Various components included in the wireless receiver 102 may be implemented using software executable by one or more servers or computers, such as a computing device with a processor and memory, and/or by hardware (e.g., discrete logic circuits, application specific integrated circuits (ASIC), programmable gate arrays (PGA), field programmable gate arrays (FPGA), etc.).

The wireless receiver 102 may include, for example, a user interface 106, a display 108, a processor 110, a memory 112, and/or a communication interface 114, which may be communicatively coupled as shown in FIG. 2 and/or by a system bus, network, etc. Processor 110 may include a general purpose processor (e.g., a microprocessor) and/or a special purpose processor (e.g., a digital signal processor (DSP)). The processor 110 may be any custom made or commercially available processor. The processor 110 may also represent multiple parallel or distributed processors working in unison.

The memory 112 may include one or more volatile (e.g., random access memory (RAM, such as DRAM, SRAM, SDRAM, etc.)) and nonvolatile (e.g., ROM, hard drive, flash drive, CDROM, etc.), removable, and/or non-removable storage components, such as magnetic, optical, or flash storage, and may be integrated in whole or in part with the processor 110. These and other components may reside on devices located elsewhere on a network or in a cloud arrangement. Further, the memory 112 may take the form of a non-transitory computer-readable storage medium, having stored thereon program instructions (e.g., compiled or non-compiled program logic and/or machine code) that, when executed by the processor 110, cause the wireless receiver 102 to perform one or more functions or acts, such as those described in this disclosure. Such program instructions may define or be part of a discrete software application that can be executed in response to certain inputs received from the user interface 106 and/or the communication interface 114, for instance. The memory 112 may also store other types of information or data, such as those types described throughout this disclosure.

The user interface 106 may facilitate interaction with a user of the wireless receiver 102. As such, the user interface 106 may include input components such as a keyboard, a keypad, buttons, knobs, a mouse, a touch-sensitive panel, a microphone, and a camera, and output components such as a display 108 (which, for example, may be combined with a touch-sensitive panel), a sound speaker, and a haptic feedback system. In embodiments, the display 108 may be a separate component from the user interface 106. The user interface 106 may also comprise devices that communicate with inputs or outputs, such as a short-range transceiver (RFID, Bluetooth, etc.), a telephonic interface, a cellular communication port, a router, or other types of network communication equipment. The user interface 106 may be internal to the wireless receiver 102, or may be external and connected wirelessly or via connection cable, such as through a universal serial bus port.

In embodiments, the user interface 106 and/or the display 108 may be included on a separate electronic device (e.g., smartphone, computer, etc.) in communication with the wireless receiver 102. An application executing on the electronic device may display menus, user options, messages, etc. and/or allow user input, as described elsewhere herein.

The communication interface 114 may be configured to allow the wireless receiver 102 to communicate with one or more devices, e.g., other wireless receivers 102 and/or the wireless transmitters 152, according to one or more protocols. In one example, the communication interface 114 may be a wired interface, such as an Ethernet interface or a high-definition serial-digital-interface (HD-SDI). As another example, the communication interface 114 may be a wireless interface.

Figure 14:
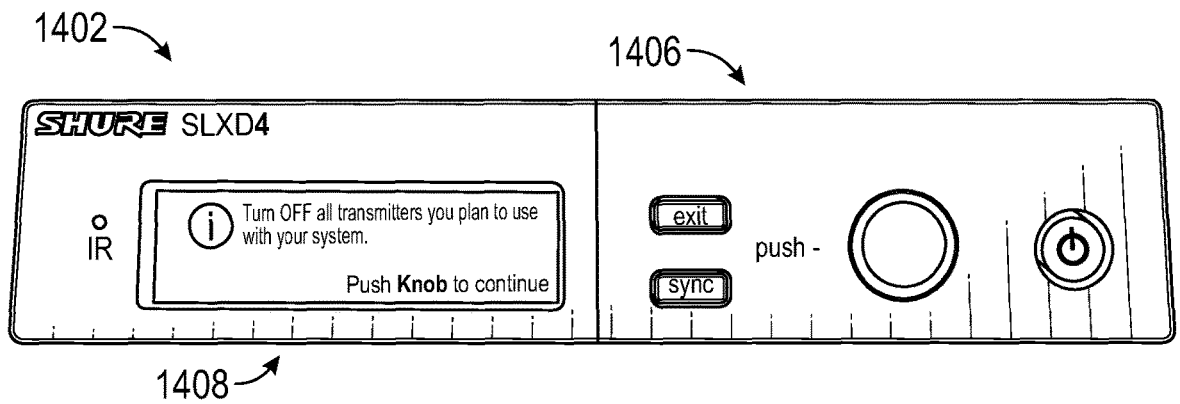
Figure 15:
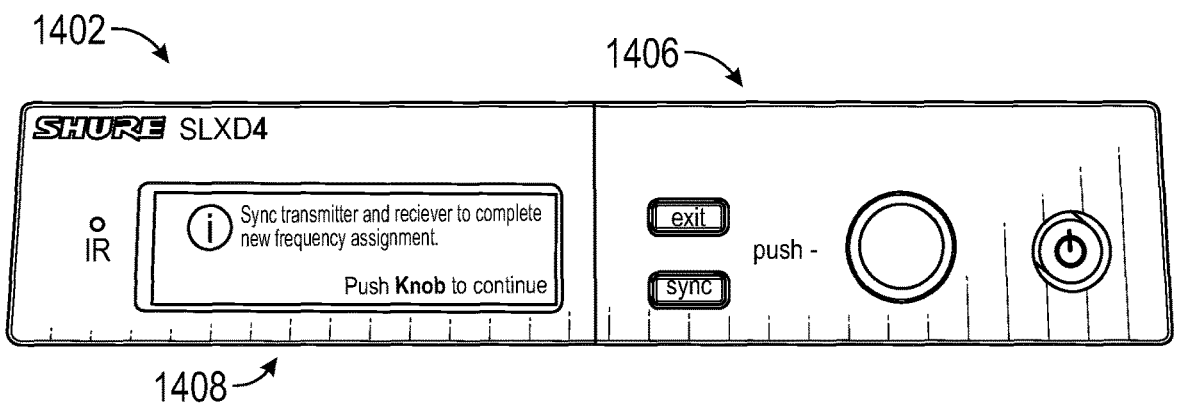

FIGS. 14-15 show exemplary front panels of a wireless receiver 1402 that may include a guided user interface. The front panel of the wireless receiver 1402 may include a display 1408 that can show various messages, menus, setup options, etc. The display 1408 may be any suitable type of display, such as an LCD display, plasma display, LED display, etc. The wireless receiver 1402 may also include a user interface 1406 for allowing a user to interact with and control the wireless receiver 1402. The user interface 1406 may include, for example, buttons (e.g., "exit", "sync", power on/off, etc.), knobs, and an infrared port.

Figure 3:
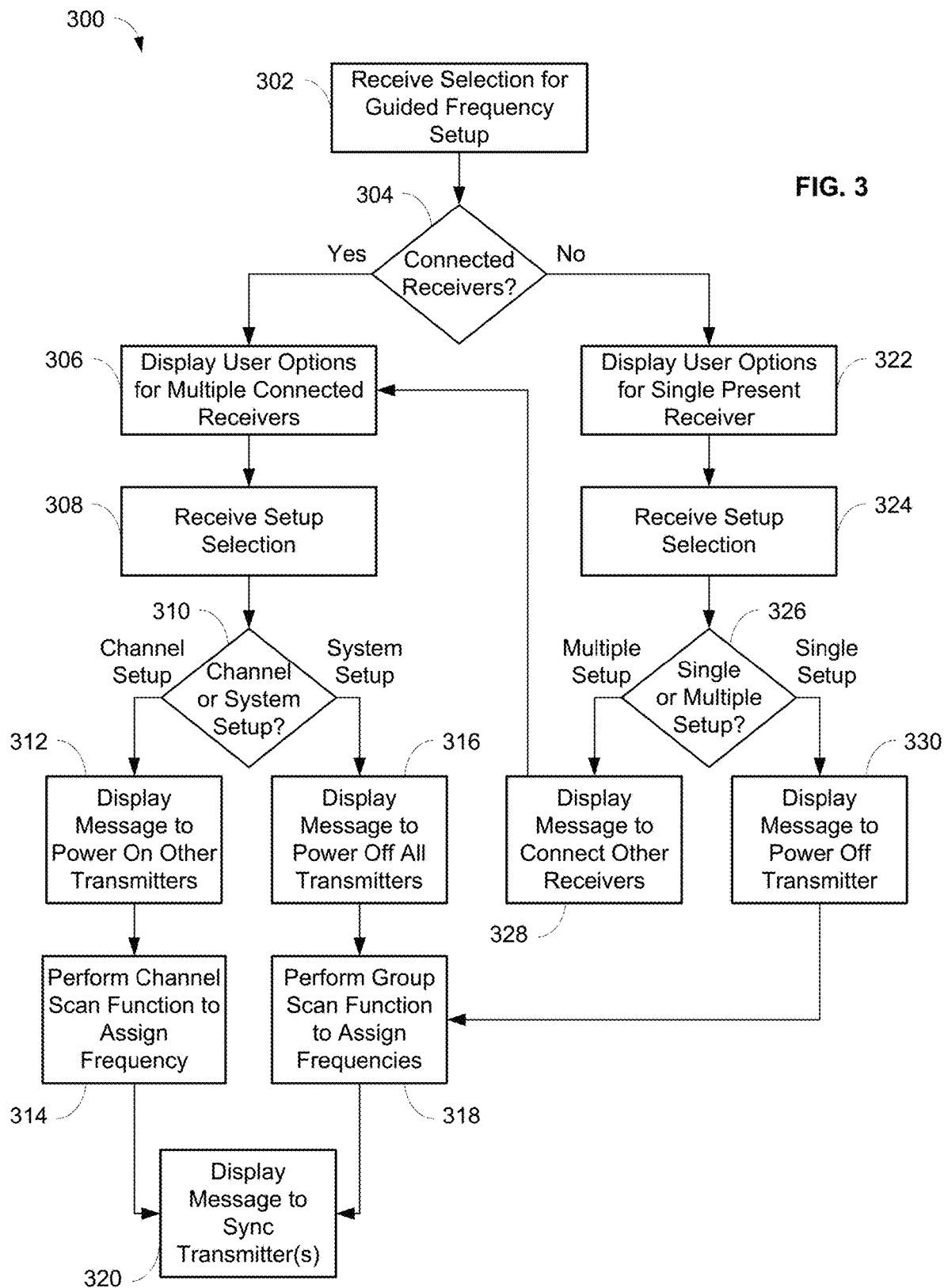
FIG. 3 is a flowchart illustrating operations for a wireless receiver having a guided user interface for configuring groups and frequencies of wireless communication between wireless receivers and wireless transmitters, in accordance with some embodiments.

An embodiment of a process 300 for a wireless receiver 102 including a guided user interface for frequency setup of wireless communications is shown in FIG. 3. One or more processors 110 and/or other processing components (e.g., analog to digital converters, encryption chips, etc.) within or external to the wireless receiver 102 may perform any, some, or all of the steps of the process 300. One or more other types of components (e.g., memory, input and/or output devices, transmitters, receivers, buffers, drivers, discrete components, etc.) may also be utilized in conjunction with the processors and/or other processing components to perform any, some, or all of the steps of the process 300. It should be noted that the various setup options and messages shown in the figures are merely exemplary and that it is possible for different wording and/or phrasing to be utilized. It should also be noted that it is possible for the various setup options and messages to be in displayed in different orders and/or be optional and not displayed in certain scenarios.

The wireless receiver 102 may be capable of displaying a variety of menus, user options, and/or messages, such as on the display 108. For example, a menu of the wireless receiver 102 may include options that allow a user to configure settings, observe statuses, perform a manual frequency scan, etc. An exemplary menu is shown in FIG. 4. As seen in FIG. 4, one of the options may be for "Guided Frequency Setup" of the wireless receiver 102. Other options shown in FIG. 4 include "Group Scan", "Channel Scan", and "Manual Frequency Setup". Additional options for the menu are contemplated and possible. At step 302, a selection of the guided frequency setup option may be received, such as from the user interface 106. In embodiments, the guided frequency setup option may be automatically selected, such as upon powering up of the wireless receiver 102 for the first time.

At step 304, it may be determined whether there are any other wireless receivers 102 connected to the wireless receiver 102 being controlled. As described previously, this scenario may occur when there is a desire to utilize a number of receiver channels that is greater than the number of receiver channels available on a single wireless receiver 102, and/or when it is desired to control and configure all of the wireless receivers 102 through a single wireless receiver 102. This scenario may also occur after a system of wireless receivers 102 has been previously set up and a new wireless receiver 102 is being added to the system.

In some embodiments, the wireless receiver 102 may automatically detect whether other wireless receivers 102 are connected to it at step 304. For example, the wireless receiver 102 may detect the presence of network packets, keep-alive signals, clock signals, and the like from other wireless receivers 102 to determine whether there are other wireless receivers 102 connected to it. In some embodiments, the wireless receiver 102 may also automatically detect other parameters of the system and the connected wireless receivers 102, such as the type(s) and/or model(s) of the connected wireless receivers 102, how many wireless receivers 102 are connected, the topology of the connected wireless receivers 102, connection protocols being utilized, states and statuses of the wireless receivers 102, frequencies previously assigned for wireless communication, etc.

In other embodiments, the user may indicate at step 304 whether there are other wireless receivers 102 connected to the wireless receiver 102 being controlled, such as through the user interface 106. For example, the wireless receiver 102 may display a message on the display 108 at step 304 that asks the user to signify whether there are connected wireless receivers 102 (e.g., "Are there other receivers connected to this receiver?") by answering "Yes" or "No" or pressing a particular button or key on the user interface 106. The user may also indicate at step 304 other parameters of the system and the connected wireless receivers 102. Regardless of how it is determined that other wireless receivers 102 are connected to the wireless receiver 102 being controlled, the fact that other wireless receivers 102 are connected (as well as how many other wireless receivers 102 are connected and other parameters) can impact the user options and messages of the guided user interface, as described in more detail below.

If it is determined at step 304 that there are other wireless receivers 102 connected to the wireless receiver 102 being controlled, then the process 300 may continue to step 306. At step 306, the wireless receiver 102 may display a set of selectable user options on the display 108 related to a system of multiple connected wireless receivers 102, such as in the exemplary set of user options shown in FIG. 5. As seen in FIG. 5, the user options may include "Initialize My System" and "Add Receiver to My System". In embodiments, the "Initialize My System" user option may be phrased as "Setup Entire System" (or similar phrasing), and the "Add Receiver to My System" user option may be phrased as "Add This Receiver to System" (or similar phrasing).

The "Initialize My System" user option may be selected by the user in the scenario of initially setting up (or re-setting up) a system of connected wireless receivers 102, for example. The "Add Receiver to My System" user option may be selected by the user in the scenario of adding a particular wireless receiver 102 to a system of connected wireless receivers 102 that has been previously set up. A selection of the user options displayed at step 306 may be received at step 308, such as through the user interface 106.

In an embodiment, one of the user options may be automatically selected at step 308 based on previous user selections and/or the detected connectedness and parameters of the wireless receivers 102. In addition, step 306 for displaying the set of selectable user options may not occur in this embodiment.

It may be determined at step 310 whether the selection of the user option received at step 308 is for a single channel setup (e.g., "Add Receiver to My System") or for a system setup (e.g., "Initialize My System"). If the selection of the user option received at step 308 is for a single channel setup at step 310, then the process 300 may continue to step 312. At step 312, the wireless receiver 102 may display a message on the display 108 that directs and instructs the user in this scenario, such as in the exemplary series of messages shown in FIG. 7. In particular, the messages may direct the user to turn on the power for all other wireless transmitters 152 that were previously set up in the system and to turn off the power for the wireless transmitter 152 that is being added to communicate with the wireless receiver 102. Such messages may also include directives to the user to acknowledge that the user has performed the requested actions, such as by pushing a knob on the user interface 1406. In embodiments, the message displayed at step 312 may be a single message, e.g., "Please power ON transmitters for all OTHER channels before scanning, and power OFF transmitter being added".

Another exemplary message that may be displayed at step 312 is shown in FIG. 14. In particular, the message on the display 1408 may direct the user to turn off the power for the wireless transmitter 152 that is being added to communicate with the wireless receiver 102. There may also be another message (not shown) in this embodiment that directs the user to turn on the power for all other wireless transmitters 152 that were previously set up in the system.

This combination of powering on and off the various wireless transmitters 152 can allow the wireless receiver 102 to scan and find an appropriate frequency that takes into account the frequencies that are already being utilized, i.e., the frequencies being used by the other wireless transmitters 152 that were previously set up in the system. In embodiments, in addition to or instead of displaying a message at step 312, the various wireless transmitters 152 may be automatically powered on and off, as needed, such as by sending commands from the wireless receiver 102 to each of the wireless transmitters 152.

In some embodiments, a further message may be displayed on the display 108 at step 312 that informs the user that a channel scan function is going to performed and provides its definition. In embodiments, the message displayed at step 312 may remind the user to use the same group for all the wireless receivers in the system, such as in the exemplary message shown in FIG. 8. This further message may help the user to avoid configuration mistakes by confirming that the user wishes to perform the channel scan function and/or by giving guidance to the user. In embodiments, the user may acknowledge the message(s) displayed at step 312 and the process 300 may continue to step 314. For example, as seen in the exemplary message on the display 1408 of FIG. 14, the message may direct the user to "Push knob to continue" (e.g., the knob of the user interface 1406) to acknowledge that the user has turned off the power for the wireless transmitter 152 that is being added to communicate with the wireless receiver 102.

At step 314, a channel scan may be performed by the wireless receiver 102, which may result in assigning a frequency for wireless communication between the wireless receiver 102 and the wireless transmitter 152 being added to the system. In embodiments, messages may be displayed to the user (not shown) that provide information on the group and channel being assigned to the wireless transmitter 152 being added. Such messages may also require the user to "Push knob to continue" to confirm the group and channel being assigned. In embodiments, the channel scan may be performed by the wireless receiver 102 at step 314 in response to detecting the combination of powering on and off the various wireless transmitters 152 described above.

After the channel scan function is completed at step 314, the wireless receiver 102 may display a message on the display 108 at step 320 to direct and instruct the user to synchronize the newly added wireless transmitter 152 to set its newly assigned frequency, such as in the exemplary message shown in FIG. 13, and the process 300 may be complete. Another exemplary message that may be displayed at step 320 is shown in FIG. 15. In particular, the message on the display 1408 may direct the user to sync the wireless receiver 102 and the newly added wireless transmitter 152 to complete the new frequency assignment, such as by lining up an infrared port of the wireless transmitter 152 with the infrared port of the user interface 1406 and pressing the "sync" button of the user interface 1406. In embodiments, the wireless receiver 102 may display an additional message on the display 108 at step 320 that informs and instructs the user to use the same group for all pairs of wireless receivers 102 and wireless transmitters 152 in the system.

In embodiments, the user may acknowledge the message displayed at step 320. For example, as seen in the exemplary message of FIG. 15, the message on the display 1408 may direct the user to "Push knob to continue" (e.g., the knob of the user interface 1406) to acknowledge that the user has synchronized the wireless receiver 102 and the newly added wireless transmitter 152 to complete the new frequency assignment. In embodiments, in addition to or instead of displaying a message at step 320, the newly added wireless transmitter 152 may be automatically synchronized, such as by sending a command from the wireless receiver 102 to the newly added wireless transmitter 152.

Returning to step 310, if the selection of the user option received at step 308 is for a system setup, then the process 300 may continue to step 316. At step 316, the wireless receiver 102 may display a message on the display 108 that directs and instructs the user in this scenario, such as in the exemplary message shown in FIG. 9. In particular, the message may direct the user to turn off the power for all of the wireless transmitters 152. The powering off of all of the wireless transmitters 152 can allow the wireless receiver 102 to scan and find appropriate frequencies that takes into account any frequencies already being utilized in the particular environment, such as those used by other wireless communications systems. In embodiments, in addition to or instead of displaying a message at step 316, the wireless transmitters 152 may be automatically powered off, as needed, such as by sending commands from the wireless receiver 102 to each of the wireless transmitters 152.

In some embodiments, a further message may be displayed on the display 108 at step 316 that informs the user that a group scan function is going to performed and provides its definition, such as in the exemplary message shown in FIG. 12. This further message may help the user to avoid configuration mistakes by confirming that the user wishes to perform the group scan function. In embodiments, the user may acknowledge the message(s) displayed at step 316 and the process 300 may continue to step 318.

At step 318, a group scan may be performed by the wireless receiver 102, which may result in assigning a group and a frequency within the group for wireless communication between each pair of wireless receivers 102 and wireless transmitters 152 in the system. In embodiments, messages may be displayed to the user (not shown) that provide information on the group being assigned to the wireless transmitters 152 being added. These messages may also require the user to "Push knob to continue" to confirm the group being assigned and to acknowledge that the group scan is going to be performed. In embodiments, the group scan may be performed by the wireless receiver 102 at step 318 in response to detecting that all of the wireless transmitters 152 have been turned off.

After the group scan function is completed at step 318, the wireless receiver 102 may display a message on the display 108 at step 320 to direct and instruct the user to synchronize the newly added wireless transmitters 152 to set their newly assigned frequencies, such as in the exemplary message shown in FIG. 13, and the process 300 may be complete. In embodiments, in addition to or instead of displaying a message at step 320, the newly added wireless transmitters 152 may be automatically synchronized, such as by sending a command from the wireless receiver 102 to the newly added wireless transmitters 152.

Returning to step 304, if it is determined that there are no wireless receivers 102 connected to the wireless receiver 102 being controlled, then the process 300 may continue to step 322. At step 322, the wireless receiver 102 may display a set of selectable user options on the display 108 related to a single wireless receiver 102, such as in the exemplary set of user options shown in FIG. 6. As seen in FIG. 6, the user options may include "Setup This Receiver" and "Setup Multiple Receivers". The "Setup This Receiver" user option may be selected by the user in the scenario of setting up only the current wireless receiver 102, for example. Furthermore, this scenario may result in the user selecting this user option on each of several independent unconnected wireless receivers 102, e.g., when it is not desired to connect the wireless receivers 102 together. The "Setup Multiple Receivers" user option may be selected by the user in the scenario of several wireless receivers 102 that the user would like to connect together to form a system. A selection of the user options displayed at step 322 may be received at step 324, such as through the user interface 106. In embodiments, the wireless receiver 102 being controlled may not include the user options for setting up a single wireless receiver 102 that are described with relation to steps 322, 324, 326, 328, and 330, and FIGS. 6, 10, and 11.

In an embodiment, one of the user options may be automatically selected at step 324 based on previous user selections and/or the detected connectedness and parameters of the wireless receivers 102. In addition, step 322 for displaying the set of selectable user options may not occur in this embodiment.

It may be determined at step 326 whether the selection of the user option received at step 324 is for a multiple receiver setup (e.g., "Setup Multiple Receivers") or for a single receiver setup (e.g., "Setup This Receiver"). If the selection of the user option received at step 324 is for a multiple receiver setup at step 326, then the process 300 may continue to step 328. At step 328, the wireless receiver 102 may display a message on the display 108 that directs and instructs the user in this scenario, such as in the exemplary message shown in FIG. 10. In particular, the message may direct the user to connect the currently unconnected wireless receivers 102 to the wireless receiver 102 being controlled. After the user connects the wireless receivers 102 together, the user may acknowledge the message displayed at step 328 and the process 300 may continue to step 306. Steps 306-320 may be performed on the newly connected system, as previously described, so that ultimately a group scan function is performed to assign a group and a frequency within the group for wireless communication between each pair of wireless receivers 102 and wireless transmitters 152 in the system.

However, if it is determined at step 326 that the selection of the user option received at step 324 is for a single receiver setup, then the process 300 may continue to step 330. At step 330, the wireless receiver 102 may display a message on the display 108 that directs and instructs the user in this scenario, such as in the exemplary message shown in FIG. 11. In particular, the message may direct the user to turn off the power for the wireless transmitter 152 being set up for wireless communication with the wireless receiver 102. The powering off of the wireless transmitter 152 being set up can allow the wireless receiver 102 to scan and find an appropriate frequency that takes into account any frequencies already being utilized in the particular environment, such as those used by other wireless communications systems. In embodiments, in addition to or instead of displaying a message at step 330, the wireless transmitter 152 being set up may be automatically powered off, as needed, such as by sending commands from the wireless receiver 102 to the wireless transmitter 152.

In embodiments, the user may acknowledge the message(s) displayed at step 330 and the process 300 may continue to step 318. Steps 318 and 320 may be performed, as previously described, so that ultimately a group scan function is performed to assign a group and a frequency within the group for wireless communication between the single wireless receiver 102 and the wireless transmitter 152.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A wireless receiver, comprising:
an antenna configured to wirelessly communicate with a wireless transmitter at a frequency;
a user interface for enabling a user to interact with the wireless receiver;
a display; and
a processor in communication with the antenna, the user interface, and the display, the processor configured to:
(A) receive a request from the user interface to configure the frequency;
(B) display setup options on the display, the setup options comprising one or more of: (1) a setup of a system of connected wireless receivers, or (2) a setup of a single wireless receiver added to the system of connected wireless receivers;
(C) receive a selection from the user interface of one of the setup options;
(D) when the selection comprises the setup of the system of connected wireless receivers:
display a first message on the display, the first message for directing the user to power off the wireless transmitter and other wireless transmitters to be used with the system; and
perform a group scan function to assign the frequency for: (1) communication between the wireless receiver and the wireless transmitter, and (2) communication between pairs of one of the system of connected wireless receivers and one of the other wireless transmitters; and
(E) when the selection comprises the setup of the single wireless receiver added to the system of connected wireless receivers:
display a second message on the display, the second message for directing the user to power on other wireless transmitters previously configured for the system and to power off the wireless transmitter; and
perform a channel scan function to assign the frequency for communication between the wireless receiver and the wireless transmitter.

2. The wireless receiver of claim 1, wherein the processor is further configured to display a third message on the display, the third message for directing the user to synchronize one or more of the wireless transmitter or the other wireless transmitters.

3. The wireless receiver of claim 1, wherein the processor is further configured to automatically determine whether the wireless receiver is connected to one or more other wireless receivers.

4. The wireless receiver of claim 3, wherein the processor is configured to display the setup options on the display based on whether the wireless receiver is connected to the one or more other wireless receivers.

5. The wireless receiver of claim 3:
wherein the setup options further comprise a setup of a single standalone wireless receiver;
wherein the processor is further configured to when the selection comprises the setup of the single standalone wireless receiver:
display a fourth message on the display, the fourth message for directing the user to power off the wireless transmitter; and
perform the group scan function to assign the frequency for communication between the wireless receiver and the wireless transmitter.

6. The wireless receiver of claim 5, wherein the processor is configured to display the setup options on the display by:
when the wireless receiver is connected to the one or more other wireless receivers, displaying the setup options of: (1) the setup of the system of connected wireless receivers, and (2) the setup of the single wireless receiver added to the system of connected wireless receivers; and
when the wireless receiver is not connected to the one or more other wireless receivers, displaying the setup option of the setup of the single standalone wireless receiver.

7. The wireless receiver of claim 1, wherein the processor is further configured to:
display a group scan definition message on the display prior to performing the group scan function; and
display a channel scan definition message on the display prior to performing the channel scan function.

8. The wireless receiver of claim 1, wherein the setup options further comprise a setup of a system of a plurality of unconnected wireless receivers.

9. The wireless receiver of claim 8, wherein the processor is further configured to when the selection comprises the setup of the system of the plurality of unconnected wireless receivers:
display a fifth message on the display, the fifth message for directing the user to connect the plurality of unconnected wireless receivers together; and
performs steps (B)-(E).

10. The wireless receiver of claim 1, wherein the display comprises an LCD display and the user interface comprises one or more of a button, a knob, or an infrared port.

11. The wireless receiver of claim 1, wherein the processor is further configured to receive input from the user interface following the display of one or more of the first message or the second message.

12. The wireless receiver of claim 1, wherein the processor is further configured to:
when the selection comprises the setup of the system of connected wireless receivers, transmit commands to power off the wireless transmitter and the other wireless transmitters to be used with the system; and
when the selection comprises the setup of the single wireless receiver added to the system of connected wireless receivers, transmit commands to power on the other wireless transmitters previously configured for the system and to power off the wireless transmitter.

13. The wireless receiver of claim 1, wherein the processor is further configured to:
when the selection comprises the setup of the system of connected wireless receivers, perform the group scan function responsive to detecting that the wireless transmitter and the other wireless transmitters to be used with the system are powered off; and
when the selection comprises the setup of the single wireless receiver added to the system of connected wireless receivers, perform the channel scan function responsive to detecting that the other wireless transmitters previously configured for the system are powered on and the wireless transmitter is powered off.

14. A wireless communication system, comprising:
a plurality of wireless transmitters; and
a plurality of wireless receivers connected to one another, wherein each of the plurality of wireless receivers is configured to wirelessly communicate with at least one of the plurality of wireless transmitters at a frequency, the plurality of wireless receivers each comprising an antenna, a user interface for enabling a user to interact with the wireless receiver, a display, and a processor in communication with the antenna, the user interface, and the display, wherein the processor is configured to:
(A) receive a request from the user interface to configure the frequency;
(B) display setup options on the display, the setup options comprising: (1) a setup of the plurality of wireless receivers, and (2) a setup of adding one of the plurality of wireless receivers;
(C) receive a selection from the user interface of one of the setup options;
(D) when the selection comprises the setup of the plurality of wireless receivers:
display a first message on the display, the first message for directing the user to power off the plurality of wireless transmitters; and
perform a group scan function to assign the frequency for communication between pairs of one of the plurality of wireless receivers and one of the plurality of wireless transmitters; and
(E) when the selection comprises the setup of adding one of the plurality of wireless receivers:
display a second message on the display, the second message for directing the user to power on any of the plurality of wireless transmitters previously configured for the system and to power off one of the plurality of wireless transmitters to be paired with the added wireless receiver; and
perform a channel scan function to assign the frequency for communication between the added wireless receiver and the paired wireless transmitter.

15. The wireless communication system of claim 14, wherein the processor is further configured to display a third message on the display, the third message for directing the user to synchronize one or more of the plurality of wireless transmitters.

16. The wireless communication system of claim 14, wherein the processor is further configured to automatically determine whether each of the plurality of wireless receivers is connected to one or more others of the plurality of wireless receivers.

17. The wireless communication system of claim 16, wherein the processor is configured to display the setup options on the display based on whether each of the plurality of wireless receivers is connected to the one or more others of the plurality of wireless receivers.

18. The wireless communication system of claim 14, wherein the processor is further configured to:
display a group scan definition message on the display prior to performing the group scan function; and
display a channel scan definition message on the display prior to performing the channel scan function.

19. The wireless communication system of claim 14, wherein the processor is further configured to:
when the selection comprises the setup of the plurality of wireless receivers:
transmit commands to power off the plurality of wireless transmitters; and
perform the group scan function responsive to detecting that the plurality of wireless transmitters is powered off; and
when the selection comprises the setup adding one of the plurality of wireless receivers:
transmit commands to power on any of the plurality of wireless transmitters previously configured for the system and to power off one of the plurality of wireless transmitters to be paired with the added wireless receiver; and
perform the channel scan function responsive to detecting that the plurality of wireless transmitters previously configured for the system is powered on and the one of the plurality of wireless transmitters to be paired with the added wireless receiver is powered off.

* * * * *